May 19, 1953 — O. G. STEEDE — 2,638,669
LATCH FOR GRASS SHEARS
Filed Nov. 6, 1950
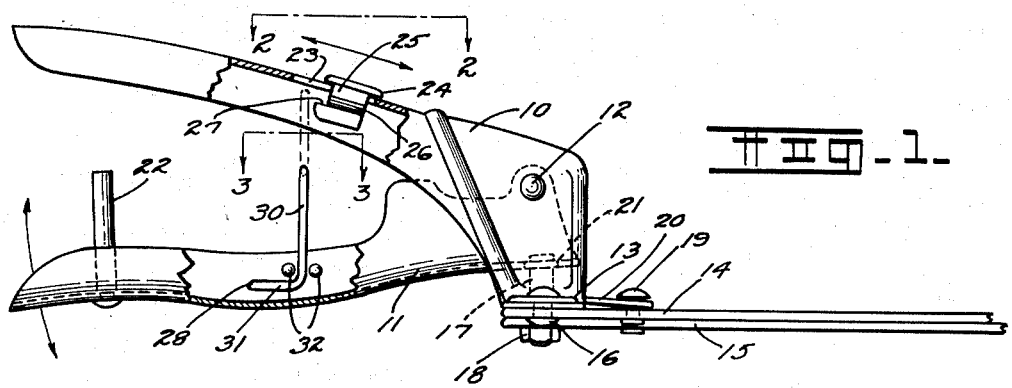
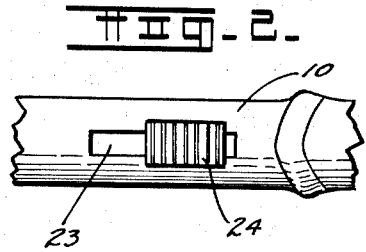
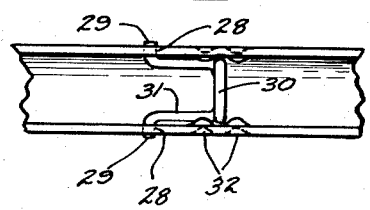
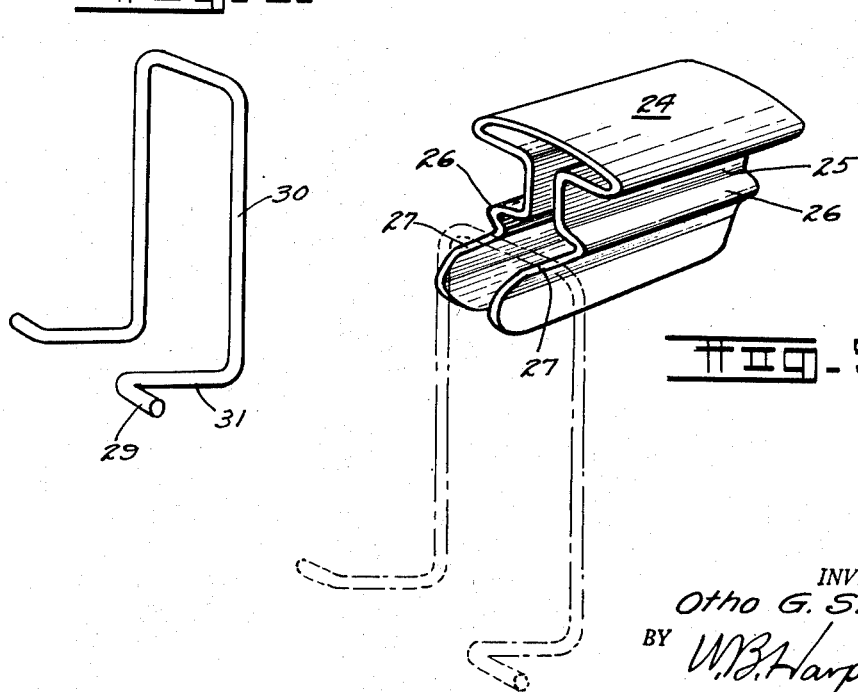
INVENTOR.
Otho G. Steede.
BY W. B. Harpman
ATTORNEY.

Patented May 19, 1953

2,638,669

UNITED STATES PATENT OFFICE 2,638,669

LATCH FOR GRASS SHEARS

Otho G. Steede, Alliance, Ohio, assignor to The Lewis Engineering & Manufacturing Company, Alliance, Ohio, a corporation of Ohio Application November 6, 1950, Serial No. 194,299

3 Claims. (Cl. 30—262)

This invention relates generally to grass shears and more particularly to latch constructions for holding the shears in inoperative position.

The principal object of the invention is the provision of a simple, inexpensive, easily operated latch for a grass shear.

A further object of the invention is the provision of a latch for a grass shear which may be simply formed and easily assembled on the handle portions of a grass shear.

A still further object of the invention is the provision of a latch for a grass shear that provides a visible, easily manipulated lever on the uppermost surface of the upper handle of the grass shear so that it may be conveniently moved by the thumb of the hand holding the grass shear.

The latch for a grass shear shown and described herein comprises an improvement in the art of latches as applied to such implements and overcomes the several disadvantages heretofore existing in connection with various latches as used on grass shears and similar implements. As is well known in the art, it has been relatively common practice to utilize a U-shaped wire bail, the outermost end of which is formed to engage the end of one of the handles of the grass shear while the bail itself was pivoted to the other of the handles. The construction thus resulting acted as a latch but frequently became disengaged accidentally and, in addition, presented a cumbersome, unattractive appearance. The latch for a grass shear disclosed herein overcomes these several difficulties and additionally positions the latch for convenient operation by the user while the grass shear is held in the user's hand and makes it unnecessary for the user to use both hands in manipulating the latch as has heretofore been the case.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a side elevation of a grass shear showing the latch thereon and with parts broken away and parts in cross section.

Figure 2 is an enlarged top plan view of a portion of Figure 1 taken on line 2—2 thereof.

Figure 3 is an enlarged top plan view of another portion of the grass shear and latch shown in Figure 1 and taken on line 3—3 thereof.

Figure 4 is an enlarged perspective view of a portion of the latch shown in Figures 1 and 3.

Figure 5 is an enlarged perspective view of another portion of the latch shown in Figures 1 and 2. Dotted lines indicate the registering position of the other portion of the latch.

By referring to the drawings and Figure 1 in particular it will be seen that a grass shear has been disclosed which includes an upper handle 10 which is relatively stationary and a lower handle 11 pivoted thereto by a pivot 12. The upper handle 10 has a bifurcated lower forward end 13 and a pair of blades 14 and 15 are pivoted to the respective portions of the bifurcated end 13 of the handle 10 by means of rivets 16. Midway between the rivets 16 a vertical stud 17 engages openings in the blades 14 and 15 and extend vertically thereabove into the area between the bifurcated end 13 of the handle 10. The lower end of the stud 17 is threaded and receives a nut 18.

Each of the blades 14 and 15 is provided with an upstanding secondary rivet 19 and a U-shaped spring 20 including several convolutions is positioned in back of the studs 17 with the arms extending forwardly and engaging the secondary rivets 19 and thereby normally urge the blades 14 and 15 apart. The lower handle 11 is of U-shaped form at its forward end and is provided with an opening 21 in which the stud 17 is engaged.

It will be observed that the opening 20 is positioned forwardly of the pivot 12 when the blades 14 and 15 are in open position and that upward movement of the lower handle 11 toward the relatively stationary handle 10 will cause the front portion of the lower handle 11 and the opening 21 therein to move rearwardly with respect to the pivot 12 and thereby impart motion to the stud 17 which will move the adjacent portions of the blades 14 and 15 rearwardly and hence cause the outermost portions thereof to move together in a cutting action. This occurs by reason of the fact that the rivets 16 are spaced sidewardly with respect to the stud 17.

The lower handle 11 has a rod 22 positioned thereon near its rearmost end. The rod 22 extends upwardly and forms means for limiting the upward motion of the handle 11 with respect to the relatively stationary handle 10.

The foregoing description relates to features of the grass shear which are known in the art and the following concerns the specific improvement disclosed herein and relating to an improved latch for a grass shear.

By referring now to Figures 1 and 2 of the drawings it will be observed that the upper handle 10 of the grass shear is provided with a longitudinally extending slot 23 therein approximately midway between its ends and that a movable latch member 24 is positioned in the slot 23 for longitudinal movement therein. The movable latch member 24 is shown in enlarged perspective elevation in Figure 5 of the drawings.

By referring to Figures 1, 2 and 5 of the drawings it will be seen that the movable latch comprises a section of metal bent into a substantial T-shape, the horizontal head portion being relatively wider than the vertical depending portion and adapted to overlie the outer surface of the upper handle 10 when the member 24 is positioned in the slot 23. The vertical portion of the member 24 is indicated by the numeral 25 and is provided with oppositely disposed, longitudinally extending ribs 26—26 and the lowermost portion of the vertically extending portions 25 extend rearwardly beyond the remainder of the member 24 so as to form horizontal latch surfaces 27. It will thus be seen that movement imparted to the latch member 24 so as to move the same longitudinally in the slot 23 of the upper handle 10 will cause the latch surfaces 27 to move back and forth with respect to a fixed point on the handle 10.

It will also be seen that the oppositely disposed ribs 26 prevent the latch member 24 from being accidentally displaced from its normal seat in the slot 23. By referring to Figure 5 of the drawings it will be observed that the construction of the latch member 24 is such that the vertical portions 25 thereof are spaced horizontally with respect to one another so that when the member 24 is initially installed in the slot 23, it is momentarily deformed as the ribs 26 must be moved toward one another along with the vertical portions 25 when the same is positioned downwardly through the slot 23 in the handle 10. Once installed, the member reassumes its original shape and is thereafter self-retaining in position in the slot.

By referring to Figures 1, 3 and 4 of the drawings it will be seen that the lower handle 11 is provided with a pair of oppositely disposed openings 28—28 which receive the outturned ends 29 of a bail 30. The bail 30 is formed with an angular bend in the same so that the portions 31 adjacent the outturned ends 29 lie on a horizontal plane and the remainder and majority of the bail 30 stands vertically. The bail 30 is held in this position by two pairs of oppositely disposed projections 32 formed in the sides of the lower handle 11 as best shown in Figures 1 and 3 of the drawings.

It will be observed that the operation of the grass shear and more particularly the moving of the lower handle 11 upwardly toward the stationary handle 10 will bring the uppermost transverse portion of the bail 30 into longitudinal alignment with the horizontal latch surfaces 27 of the latch member 24 so that upon movement of the member 24 the bail is secured on the horizontal latch surfaces 27 and the handles 10 and 11 thus secured to one another in closed position with the blades 14 and 15 of the shear also in closed position.

It will thus be seen tha the latch for a grass shear may be easily operated by merely moving the latch member 24 forwardly and backwardly in the slot 23 and that at such time as the handles 10 and 11 are moved into adjacent position, the latch 24 may be moved backwardly to engage the bail 30 and thus hold the same in latched position. Alternately, reverse movement imparted to the latch member 24 will release the bail 30 and permit the grass shear to be used.

It will thus be seen that the several objects of the invention have been met by the latch for a grass shear disclosed herein.

Having thus described my invention, what I claim is:

1. A latch for a grass shear having a pair of handles pivoted to one another and including portions extending outwardly from the said pivots, one of the said portions having a longitudinally extending slot therein and the other having a pair of oppositely disposed openings therein and oppositely disposed pairs of spaced bosses adjacent thereto, said latch comprising a latch member slidably positioned in the said slot and a bail engaged in the said oppositely disposed openings and secured between said pairs of bosses, a portion of the said bail lying in proximity to a portion of the said latch when the said handles are moved to adjacent position, the said latch member having a projecting portion registrable with said bail to latch the said handles to one another when the latch portion is moved into engagement with said bail.

2. The latch for a grass shear set forth in claim 1 and further characterized by the formation of the latch member in a cross sectionally hollow T-shape open at its lower end, a horizontal portion of the latch member overlying the said handle and a vertical portion of the latch member having longitudinally extending, oppositely disposed ribs registering beneath the handle to maintain the latch member in position in the handle, the said latch member being distortable to enable it to be placed in said longitudinally extending slot.

3. The latch for a grass shear set forth in claim 1 and further characterized by the said bail taking the form of an inverted U-shape, the lower portions of which are bent at right angles to the remainder and the said lower portions having outturned ends for registry with openings in the said lower handle.

OTHO G. STEEDE.

References Cited in the file of this patent

UNITED STATES PATENTS

| Number | Name | Date |
|---|---|---|
| 450,342 | Schollhorn | Apr. 14, 1891 |
| 1,809,556 | Jolidon | June 9, 1931 |
| 2,208,949 | Rauh | July 23, 1940 |